(12) United States Patent
Foster et al.

(10) Patent No.: US 7,647,141 B2
(45) Date of Patent: Jan. 12, 2010

(54) ADVANCED SIMULATION CAPTURE AND REPORTING TOOLS

(75) Inventors: C. Mackay Foster, Burleson, TX (US); Michael J. Hawthorne, Arlington, TX (US)

(73) Assignee: New York Air Brake Corporation, Watertown, NY (US)

( * ) Notice: Subject to any disclaimer, the term of this patent is extended or adjusted under 35 U.S.C. 154(b) by 855 days.

(21) Appl. No.: 11/170,159

(22) Filed: Jun. 30, 2005

(65) Prior Publication Data

US 2005/0246075 A1 Nov. 3, 2005

Related U.S. Application Data

(63) Continuation-in-part of application No. 10/212,782, filed on Aug. 7, 2002, now Pat. No. 7,096,171.

(60) Provisional application No. 60/584,680, filed on Jul. 2, 2004.

(51) Int. Cl.
*G06F 7/00* (2006.01)
(52) U.S. Cl. ............................. 701/19; 701/20; 701/29; 703/7; 703/8; 434/29
(58) Field of Classification Search .................. 701/19, 701/20, 29, 119; 434/29; 703/7, 8
See application file for complete search history.

(56) References Cited

U.S. PATENT DOCUMENTS

| 3,885,324 | A | 5/1975 | Davenport et al. |
| 3,957,236 | A | 5/1976 | Phelps et al. |
| 4,041,283 | A | 8/1977 | Mosier |
| 4,042,810 | A | 8/1977 | Mosher |
| 4,181,943 | A | 1/1980 | Mercer, Sr. et al. |
| 4,236,215 | A | 11/1980 | Callahan et al. |
| 4,301,899 | A | 11/1981 | McSparran et al. |
| 4,344,364 | A | 8/1982 | Nickles et al. |
| 4,602,335 | A | 7/1986 | Perlmutter |
| 4,735,385 | A | 4/1988 | Nickles et al. |

(Continued)

FOREIGN PATENT DOCUMENTS

EP 0 114 633 A1 8/1984

(Continued)

OTHER PUBLICATIONS

Orsillo, James, "Simulation Applications for the Digital Railroad," Orthstar, Inc. (Sep. 2002).

(Continued)

*Primary Examiner*—Thomas G Black
*Assistant Examiner*—Wae Louie

(57) ABSTRACT

A method of processing and displaying train performance including analyzing train data received from the train or train simulator real time or from a data storage and preparing display data of the results of the analysis. Computer graphic images are created from the display data; and the computer graphic images are provided for display. A display may be a drive with the display data and displayed portions of the display data may be selected to be created into computer graphic images. The computer graphic images may be transmitted over the internet or stored on a portable store and ultimately displayed on a video player. The computer graphic images may be viewed and edited or enhanced.

10 Claims, 4 Drawing Sheets

U.S. PATENT DOCUMENTS

| | | | |
|---|---|---|---|
| 4,750,888 A | 6/1988 | Allard et al. | |
| 4,827,438 A | 5/1989 | Nickles et al. | |
| 4,853,883 A | 8/1989 | Nickles et al. | |
| 4,952,152 A | 8/1990 | Briggs et al. | |
| 5,280,418 A | 1/1994 | Griffin | |
| 5,354,202 A | 10/1994 | Moncrief et al. | |
| 5,368,484 A | 11/1994 | Copperman et al. | |
| 5,550,738 A | 8/1996 | Bailey et al. | |
| RE35,590 E | 8/1997 | Bezos et al. | |
| 5,744,707 A | 4/1998 | Kull | |
| 5,758,299 A | 5/1998 | Sandborg et al. | |
| 5,893,893 A | 4/1999 | Holt et al. | |
| 6,144,901 A * | 11/2000 | Nickles et al. | 701/19 |
| 6,219,595 B1 * | 4/2001 | Nickles et al. | 701/19 |
| 6,226,577 B1 | 5/2001 | Yeo | |
| 6,263,266 B1 * | 7/2001 | Hawthorne | 701/19 |
| 6,332,106 B1 * | 12/2001 | Hawthorne et al. | 701/19 |
| 6,371,416 B1 * | 4/2002 | Hawthorne | 246/122 R |
| 6,382,378 B1 | 5/2002 | Cornic | |
| 6,480,766 B2 * | 11/2002 | Hawthorne et al. | 701/19 |
| 6,487,478 B1 * | 11/2002 | Azzaro et al. | 701/24 |
| 6,559,769 B2 * | 5/2003 | Anthony et al. | 340/574 |
| 6,748,303 B2 * | 6/2004 | Hawthorne | 701/19 |
| 7,096,171 B2 * | 8/2006 | Hawthorne et al. | 703/8 |
| 7,143,017 B2 * | 11/2006 | Flynn et al. | 703/6 |
| 7,188,341 B1 | 3/2007 | Hawthorne et al. | |
| 2001/0029411 A1 * | 10/2001 | Hawthorne | 701/19 |
| 2002/0169530 A1 * | 11/2002 | Laguer-Diaz et al. | 701/35 |
| 2002/0183995 A1 * | 12/2002 | Veitch et al. | 703/7 |
| 2005/0119804 A1 * | 6/2005 | Hawthorne | 701/19 |
| 2005/0246075 A1 * | 11/2005 | Foster et al. | 701/19 |
| 2005/0258942 A1 * | 11/2005 | Manasseh et al. | 340/425.5 |

FOREIGN PATENT DOCUMENTS

| | | |
|---|---|---|
| EP | 0 257 662 A2 | 3/1988 |
| EP | 0 539 885 A2 | 5/1993 |
| EP | 0 755 840 A1 | 1/1997 |
| GB | 2 188 464 A | 9/1987 |
| WO | WO 90/03622 | 4/1990 |

OTHER PUBLICATIONS

Transport Technology, IIT Research Institute (2002).

ITT Research Institute's 2001 Annual Report and Year in Review.

* cited by examiner

ADVANCED SIMULATION CAPTURE AND REPORTING TOOLS

CROSS REFERENCE

This application claims benefit of Provisional U.S. Patent application Ser. No. 60/584,680 dated Jul. 2, 2004, and is a continuation-in-part of U.S. application Ser. No. 10/212,782, filed Aug. 7, 2002 now U.S. Pat. No. 7,096,171.

BACKGROUND AND SUMMARY OF THE DISCLOSURE

The present disclosure relates generally to simulators and more specifically with capturing and displaying images on a simulator.

The TDS Simulator product and LEADER product from New York Air Brake (NYAB) produce tremendous amounts of data and information from both training and analysis sessions. The presentation of such information can take many forms for audiences of varying expertise in the subject matter.

Further capability was added to investigate accidents by playing back the event recorder data through the TDA, monitoring critical physical parameters. Through the years, data was collected from instrumented trains and laboratory experiments, allowing the models used by the TDA to be refined. On board data collection for off-loading is shown in U.S. Pat. Nos. 4,561,057 and 4,794,548.

As more Locomotive Engineers became familiar with the TDA display through training sessions, it became apparent that a real-time version of the TDA in the cab of a locomotive would offer substantial benefits in improved train handling. Earlier designs for on board computer controllers are shown in U.S. Pat. No. 4,042,810 with a description of math models. A Locomotive Engineer Assist Display and Event Recorder (LEADER) system, as described in U.S. Pat. No. 6,144,901, is a real-time, enhanced version of the Train Dynamics Analyzer (TDA).

The LEADER system has the ability to display a real-time or "live" representation of a train on the current track, the trackage ahead, the dynamic interaction of the cars and locomotives (both head end and remote), and the current state of the pneumatic brake system. As a tool for the Locomotive Engineer, the LEADER system allows insight into the effect of throttle changes and brake applications throughout the train providing feedback and information to the Locomotive Engineer not currently available. The information offered by the LEADER system provides an opportunity for both safer and more efficient train handling leading to enormous potential economic benefits.

The LEADER system has all the necessary information to predict the future state of the train given a range of future command changes (what if scenarios). With this ability, LEADER can assist the railroads in identifying and implementing a desired operating goal; minimize time to destination, maximize fuel efficiency, minimize in train forces, (etc.) or a weighted combination thereof. LEADER will perform calculations based on the operational goal and the current state of the train to make recommendations to the Locomotive Crew on what operating changes will best achieve these goals.

The LEADER system also has the capability of analyzing train handling by setting a standard for the run, collecting train operating and handling data from the run and determining operating constraints during the run which are not included in the standard run. The determination of operating constraints during a run also includes determining differences between the operating constraints during the run of those included in the standard. The train handling data is compared to the standard and the comparison is adjusted for the operating constraints. A report is created from the standard and the handling data correlating the energy usage for specific categories. These capabilities are described in U.S. Pat. No. 6,332,106.

A method of analyzing train operational data recorded during each run of a train and transferred to a processing station to create a variable exception report is described in U.S. Pat. No. 6,748,303. Operational and informational parameters are derived from the recorded operational data for each run. The operational and identification parameters and the corresponding operational data are stored as a standard database record for each run. The operational parameters are compared to selected exception values and the variance of the comparison are stored with the standard operational database record for each run. A search is then performed of the stored standard database records based on one or more of operational parameter, identification parameter, operational data and variance.

TDAs are usually available at a training site and are not typically mobile or portable. Also, LEADER systems are available on the train and are also generally not portable. There is a need in the industry for a truly portable simulator and playback station.

This disclosure describes a method by which the graphical results of the simulation session or actual train runs can be captured into a time sequenced graphical format (computer graphic images) which can be sequentially played on a standard media device on most any computer or video player. This would alleviate the need to provide a complete playback station to any potential user of the data. The presentation can be further enhanced to emphasize various aspects of the graphics using the suite of analysis tools available from the LEADER and Simulator Products.

In summary, the present disclosure is a method of processing and displaying train performance including analyzing train data received from the train or train simulator real time or from a data storage and preparing display data of the results of the analysis. Computer graphic images are created from the display data; and the computer graphic images are provided for display. A display may be a drive with the display data and displayed portions of the display data may be selected to be created into computer graphic images. The computer graphic images may be transmitted over the internet or stored on a portable store and ultimately displayed on a video player. The computer graphic images may be viewed and edited or enhanced.

Other objects, advantages and novel features of the present disclosure will become apparent from the following detailed description when considered in conjunction with the accompanying drawings.

DETAILED DESCRIPTION OF THE PREFERRED EMBODIMENTS

Figure 1:
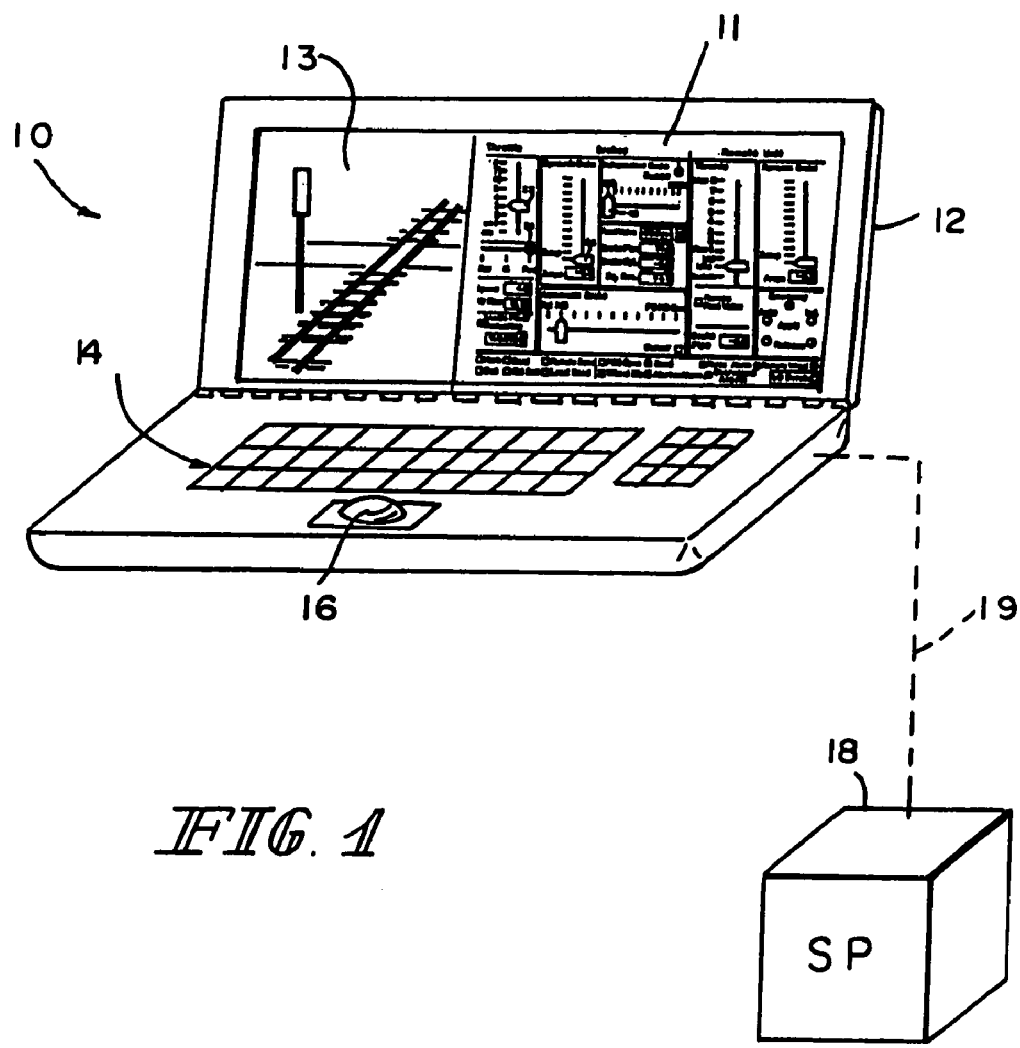
FIG. 1 is a perspective view of a portable simulator and playback station, according to the principles of the present disclosure.

A portable simulator and/or playback device 10 is illustrated in FIG. 1. It is illustrated as a portable, personal computer. It includes a microprocessor and an integral display 12. It includes an input device for the microprocessor. The input devices include a keyboard 14, a mouse 16 or the touch screen of display 12. The program for simulation or playback is included in the microprocessor or may lie in a remote microprocessor 18. The portable simulator 10 may be connected to the remote microprocessor 18 by a network 19. The network may be, for example, the internet.

Figure 2:
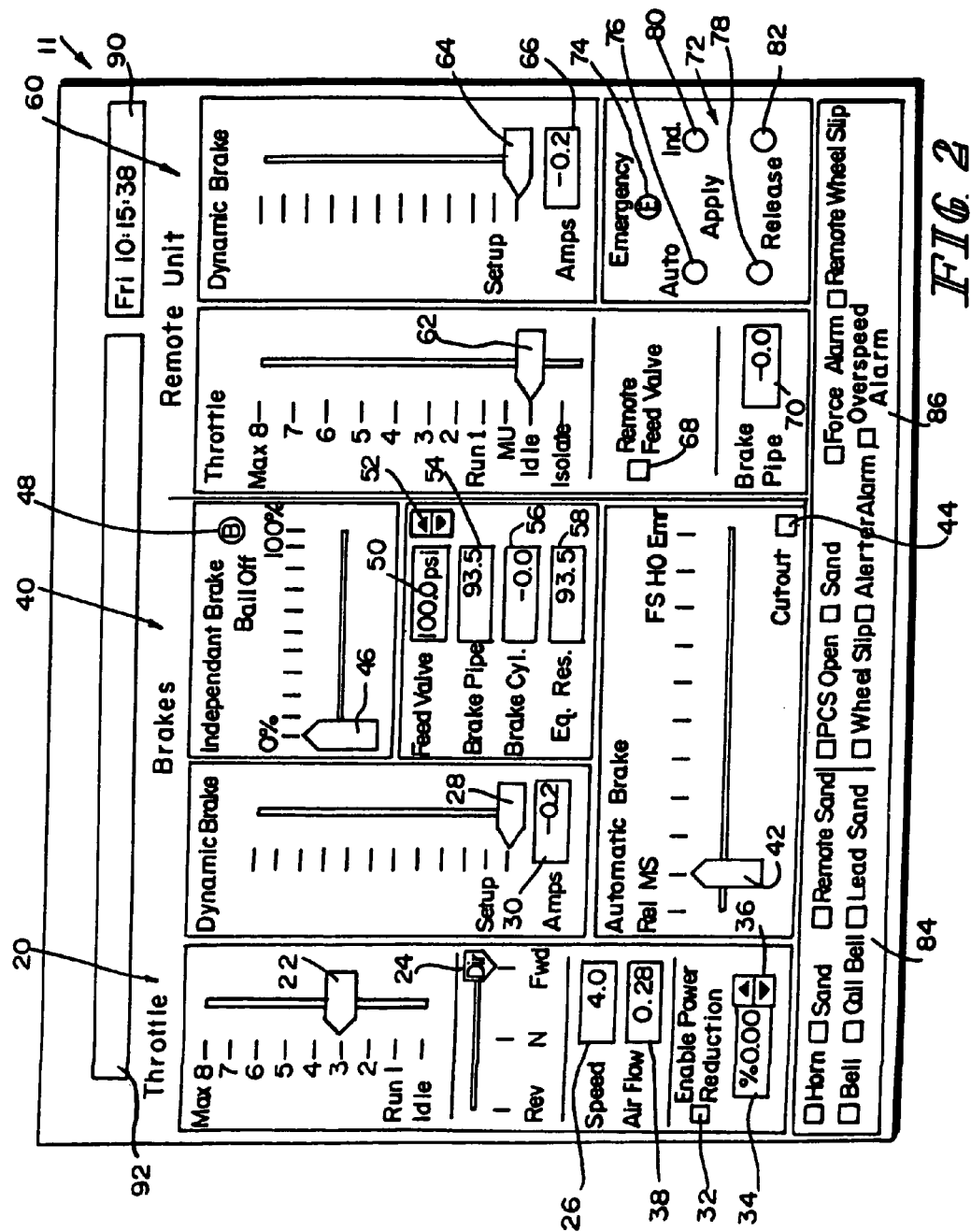
FIG. 2 is an illustration of a display of a virtual control stand.
Figure 3:
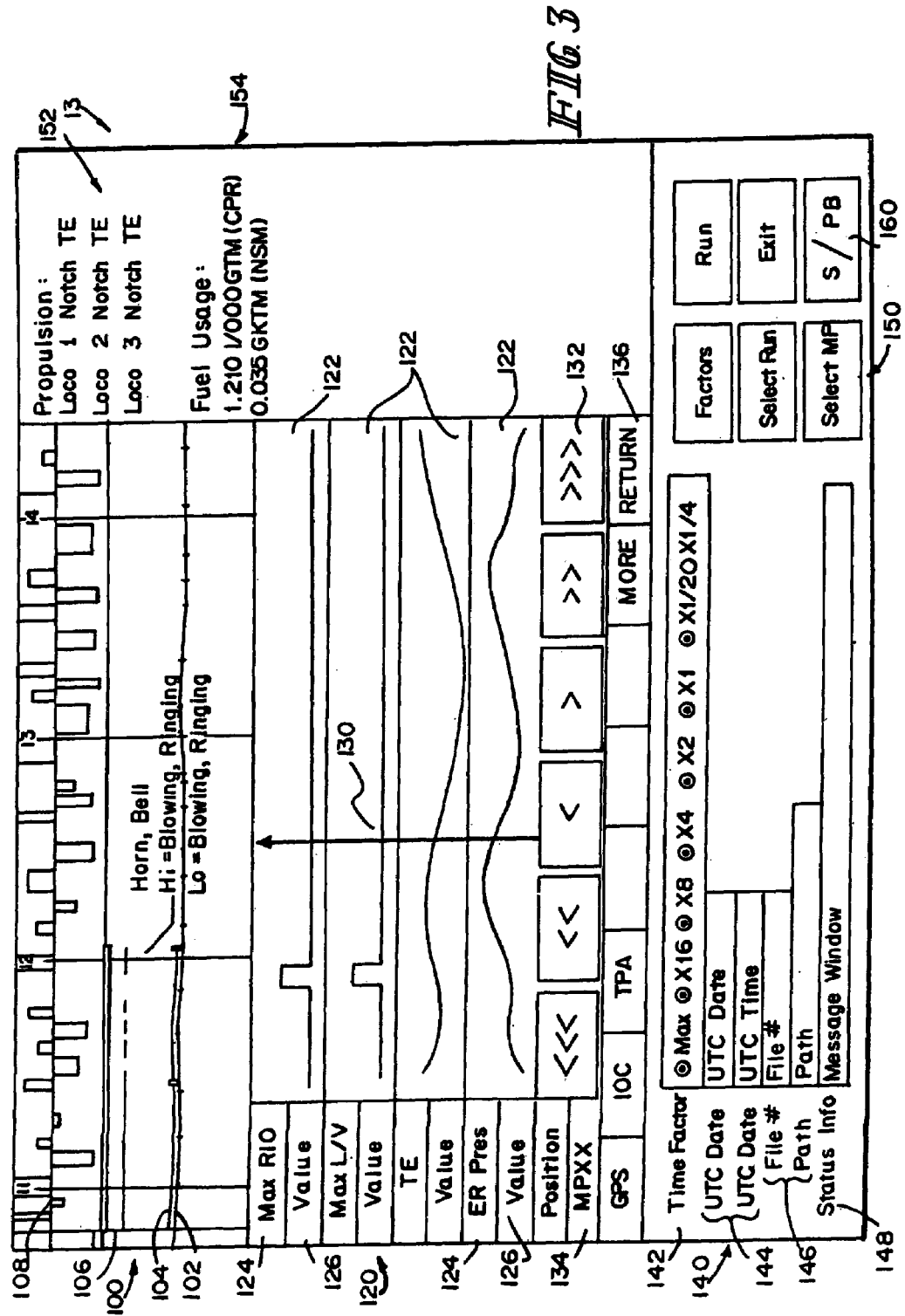
FIG. 3 illustrates a display including a strip chart, according to the principles of the present disclosure.

The display 12 may be a split display, as illustrated, with a virtual control stand 11 and a depiction of a track to be traversed 13. One detailed embodiment of the virtual control stand 11 is illustrated in FIG. 2, and one example of the track to be traversed with other information is illustrated in FIG. 3. Alternatively, the displays 11 and 13 may be full-screen displays with the ability to switch there between. As with many other software-based systems, multiple screens may be displayed side-by-side, staggered or full-screen reduced and restored.

An example of a virtual control stand that allows the simulator and playback station to be truly portable is illustrated in FIG. 2. Virtual control stand 11 includes a throttle portion 20 having a throttle position indicator and controller 22 extending between throttle run positions 1 and 8 and idle. It also includes a direction selection indicator 24 between forward, reverse and neutral. The window 26 indicates the speed of the vehicle. The dynamic brake portion indicator and controller 28 is part of the brake control, and the opposite position of the throttle is provided. A window 30 to display the amperes of the dynamic brake and traction motor current (both for DC locomotives) is also provided. An enable power reduction button 32 is provided, as well as an adjustment 36 for the amount of power reduction in window 34. Window 38 illustrates the air flow rate in the brake pipe.

The brake portion 40 of the virtual control 11 includes an automatic brake indicia and controller 42 and an automatic brake cut-out button 44. This is to control the brake pipe for train braking. The independent brake for the locomotive includes an independent brake indicia and controller 46 and a bail-off or actuate button 48. The bail-off button 48 allows release of the independent brakes of the locomotive. Window 50 shows the feed valve value, which is adjusted by button 52. Window 54 illustrates a brake pipe pressure, window 56 the brake cylinder pressure and window 58 the equalization reservoir pressure.

Section 60 indicates the value of the controls for a remote locomotive unit. Slide 62 provides an indication and control of the throttle position, and slide 64 indicates and controls the amount of dynamic brake. Window 66 displays the amperes of both the traction motors and dynamic brake system (for DC locomotives). Button 68 controls the remote feed valve. Window 70 indicates the brake pipe pressure at the remote locomotive unit.

Section 72 illustrates pneumatic brake controls for trains with the remote power. It includes a control 74 for an emergency brake at the remote unit. Buttons 76 and 78 apply and release the automatic brakes, and buttons 80 and 82 apply and release the independent brakes for the remotely controlled locomotives.

Panel 84 depicts the auxiliary functions of the locomotive. These functions both control the function and indicate their status. This includes horn, bell, sand, call bell, remote sand and lead sand. Panel 86 provides indicia depicting the status or warnings. It includes power cutout switch open, wheel slip, sand, alerter alarm, overspeed alarm and remote wheel slip. Window 90 is a clock illustrating the date and time. Window 92 is a screen for miscellaneous messages to the engineer.

The majority of the depicted indicia and controls are those available on a standard control stand. The position of the indicia for the throttle dynamic brake, independent brake, automatic brake and those elements on the remote unit are controlled by an input device. As previously discussed, this may be the keyboard 14, the mouse 16 or a touch screen control. One or more software programs may be provided to drive the display to depict the various elements of the virtual control stand 11, as well as the changing of the controls in response to control inputs from the input device. Other control devices may also be implemented with the virtual control stand 11. These may include combined throttle and dynamic brake and other distributed power interfaces.

The depiction of the track 13 may be a video of the track or computer generated images, as illustrated in FIG. 1, which shows a track plus a crossing and a signal light. A second program in the portable simulator 10 has data file of the track and provides it as the train moves along the track. This second program is also responsive to the inputs from the first program or control stand to appropriately progress along the track based upon the stored conditions of the track from the data file, as well as inputs from the throttle and brakes from the control stand 11.

Alternatively, the track display 13 may be that illustrated in FIG. 3. The track display portion 100 includes the track profile in three views. The train may be represented on the track in these views. The horizontal view of the track 102 shows the grade in which the train is currently positioned and the grade of the track profile for a number of miles. It shows the geographic shape as a vertical slice of the track profile. An overhead or vertical view 106 incorporates symbols that represent track structure, such as crossing, signals, overpasses, underpasses and sidings. The track curvature representation 108 is made up of blocks that represent track curvature. A block above the dividing line represents a curvature to the right, and a block below the dividing line represents a curvature to the left. The longer the block, the longer the curvature. The higher the block, the more severe the curve. This example of a TDA display or a LEADER display is shown in U.S. Pat. No. 6,144,901.

The track view 100 may also be provided in the same software for, and be an alternative to, the graphic or video display of FIG. 1. If the LEADER system is available on the locomotives for that railroad, the LEADER display would be preferable for training purposes. It should also be noted that a full LEADER display, as shown in FIG. 5 of U.S. Pat. No. 6,144,901, may also be provided in the portable simulator 10.

The display of operating parameters may be on the virtual control stand 11, as shown in FIG. 2, or part of the track display 13, as shown in FIG. 3. Whereas the control stand display of operating parameters is for the present operating parameter, the display in the track portion 13 is correlated to the track position and represents a history of the operating conditions as the lead locomotive traverses the track. Both may also be displayed. If a standard LEADER-type display is used, the present conditions of the operating parameters would be illustrated as part of the track display 13.

Section 120 of the display 13 of FIG. 3 is a strip chart representation of operating parameters. It illustrates the history of the parameter correlated to the location of the track. Even though the representation 120 in FIG. 3 shows the history of a portion of where the train has not reached yet, in a simulator mode it will display only that portion which the train has traversed. The illustration FIG. 3 is a playback mode wherein the data file includes the depiction of the track and its correlated operating parameters. The operating parameter display may also be configured to show values ahead of the train if so desired by the user in the playback mode.

It should be noted that display 13 of FIG. 3 may be used on any simulator or playback station whether it is portable or not. It may be used with or without a control stand for playback analysis of data collected from a train on a particular run with the operating parameters correlated to the track information.

The Strip Chart Display 120 includes a plurality of graphics 122 illustrating the value of the operating parameter. Window 124 indicates the name of the value, and 126 would display the actual numerical value at the position selected by pointer 130. Controls 132 move the pointer to the position on the track display. The position in miles is indicated in Window 134. A row of buttons 136 provides the standard control of the track display 100. This allows moving of the track display and the correlated operating parameters by time, location or other operational parameters. The zoom in and out control provides the amount of track shown. The movement of the playback may be accelerated, real time or for actual playback speed control.

The operating parameters 124 to be displayed may be selected. These may include, but not be limited to, tractive effort, dynamic brake effort, end of train brake pipe pressure, run in/out (RIO) forces, brake system pressures, lateral over vertical (L/V) force ratio, traction motor current, traction motor voltage, speed, speed limit, acceleration, heading, buff/draft forces, minimum safe brake pipe reduction, actual brake pipe reduction, fuel consumed, horn use, bell use, throttle setting and dynamic brake setting. This system may also automatically identify exceptions, such as over-speed, and highlight these events on the display.

The control section 140 includes the time factor 142, the time and date for the run 144, the file and path number 146 and a miscellaneous status information message window 148. The controls 150 provide control of the time factor 142, the run selection and the select parameter button. It also provides control of a run by a start and stop button, as well as an exit from the program. Display 152 provides the propulsion controller position of each locomotive in the train, as well as provides the fuel usage 154. As previously discussed, the whole history section 120 is displayed in a playback station and only that which has transpired would be displayed in a simulator. The playback system will allow the operator to select a location by track position in either the strip chart representation or the LEADER system representation and be able to flip back and forth between the two. All presented data would be accurate for each screen with the position of the train in the playback being preserved.

The present process by which dynamic information displayed on a simulator or LEADER display on a train or playback unit of is captured (as individual frames) and converted to a format suitable for visual playback (video) on other user equipment. The dynamic information displays include the LEADER screen, the entire LEADER playback window, the simulator profile display, and the brake plot of FIGS. 1-3.

The visual playback on user equipment includes Windows Media Players on Windows, Quicktime on Windows and Apple computers, and video (whether in regular or high-definition format). Thus, the output to be played can be in a digital format for computers, one of the modern digital video formats, or an analog scanline image as in television video. On the computer side, there are numerous codices, some of which are more suitable than others for this type of image, and some of which are more common and available on a particular type of computer as in the differences between PC and Macintosh computers. Particularly on the computers, the playback can be stand-alone or embedded in some other presentation package (like PowerPoint). It can also be streamed over the Internet using suitable formats and players.

In a suitable standard format, the video can be edited, annotated, or otherwise enhanced with detailed or summary results from any of NYAB's analysis and monitoring tools in order to emphasize the desired information. Computer generated images clips can be synchronized to the playback to further enhance the presentation of results. The final output of the toolset is highly portable to most modern PC's and can be packaged to meet a variety of demonstration needs.

In the present method, a simulation analysis (for example variable exception reporting as described in U.S. Pat. No. 6,748,303) can use various trigger levels to visually/audibly mark or highlight areas of exceptions during initial analysis for display. Such marking are intended to draw the user's attention to areas of interest as arbitrarily defined by the user. For example, the user may ask the system to identify excessive in-train forces over 200 klbs. The system would mark such events on the graphic in advance, during, and after the actual event to allow the user to see what led to the event, the event itself, and how the train operator recovered from the event. Reaching the point of interest in the playback may be accompanied by an audible alarm.

The graphics could be played back at accelerated or fractional real-time speed. A feature to jump to the next marked exception event in the viewing assists the user in finding areas of interest.

The creator of the graphics will be able to annotate the playback with multimedia information such as graphics (bookmarks), audio files, or video files. For example, if the creator identified what they thought was the point of derailment for a train, they might drop a mark in the file and record a message that would play when that point in the playback was reached. The creator may pause the playback for the audio or even suspend the playback in favor of a video clip. The playback could resume when the video clip was complete.

Figure 4:
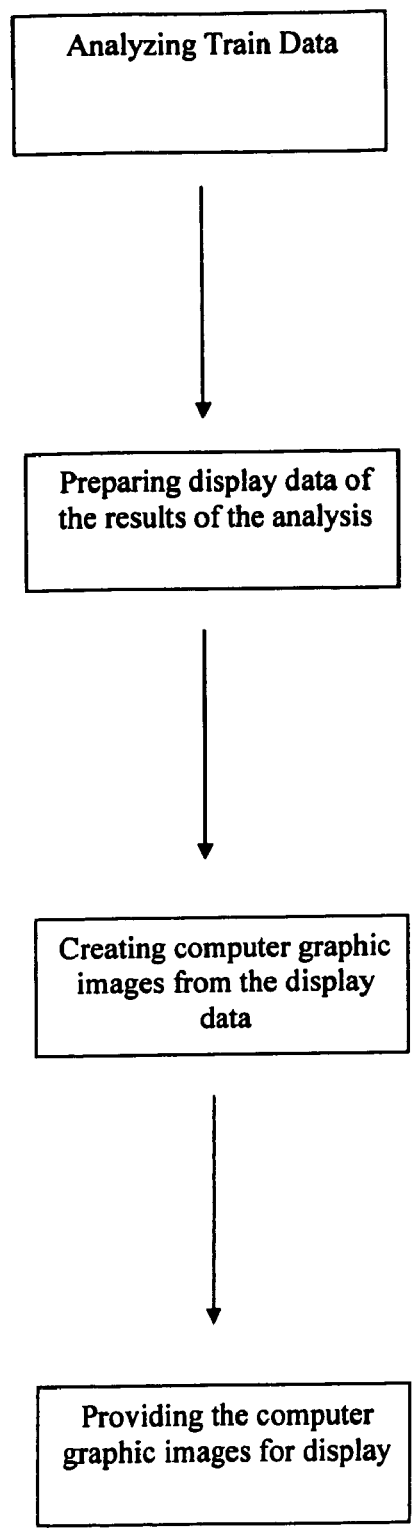
FIG. 4 is a block diagram of the method of the present disclosure

In summary, the present disclosure is a method of processing and displaying train performance as illustrated in FIG. 4. The method includes analyzing train data received from the train or train simulator real time or from a data storage and preparing display data of the results of the analysis. Computer graphic images are created from the display data; and the computer graphic images are provided for display. A display may be a drive with the display data and displayed portions of the display data may be selected to be created into computer graphic images. The computer graphic images may be transmitted over the internet or stored on a portable store and ultimately displayed on a video player. The computer graphic images may be viewed and edited or enhanced.

All or parts of the display of the simulator or the onboard display may be selected for creating the computer generated images. Portions of the time history of the display may also be selected. Other displays or display data of others displays may be used in the present method. All of the time sequenced computer images can be synchronized such that when a reviewer of the data sets the playback in motion, all images, representing different captured aspects of the simulation, are presented in concert.

Although the present disclosure has been described and illustrated in detail, it is to be clearly understood that this is done by way of illustration and example only and is not to be taken by way of limitation. The scope of the present disclosure is to be limited only by the terms of the appended claims.

What is claimed:

1. In a system for collecting and displaying train performance data on a screen for run of a train along a tract, a method of processing train performance for redisplay comprising:

capturing images of the screen display;

analyzing train data received from the train or train simulator real time or from a data storage;

modifying at least one of the captured images of the screen display as a result of the analysis; and providing the modified captured images for redisplay with the unmodified captured images.

2. The method according to claim 1, including driving a display with the modified captured images.

3. The method according to claim 1, wherein the images of the screen display are selectively captured real time.

4. The method according to claim 1, including displaying the modified captured on a video player.

5. The method according to claim 1, wherein the providing includes transmission over the internet.

6. The method according to claim 1, wherein the providing includes storing the modified captured images on a portable store.

7. The method according to claim 1, including viewing and editing or enhancing the modified captured images.

8. The method according to claim 1, wherein the modified screen image includes additional material including one or more of audio and visual files; and including interrupting the sequential redisplay of the captured images and presenting the additional material.

9. The method according to claim 1, wherein the analyzing is performed based on preselected criteria during the run of the train and captured images are tagged for modification.

10. The method according to claim 9, wherein modifying is performed after the run of the train.

* * * * *